United States Patent [19]
Fujimoto et al.

[11] Patent Number: 5,214,707
[45] Date of Patent: May 25, 1993

[54] CONTROL SYSTEM FOR CONTROLLING EQUIPMENT PROVIDED INSIDE A VEHICLE UTILIZING A SPEECH RECOGNITION APPARATUS

[75] Inventors: Shoji Fujimoto, Kobe; Kazuya Sako, Kakogawa; Minoru Takahashi, Kobe, all of Japan

[73] Assignee: Fujitsu Ten Limited, Hyogo, Japan

[21] Appl. No.: 745,759

[22] Filed: Aug. 16, 1991

[30] Foreign Application Priority Data

Aug. 16, 1990 [JP] Japan .................................. 2-214953
Sep. 11, 1990 [JP] Japan .................................. 2-238877

[51] Int. Cl.$^5$ .......................... G10L 5/06; G10L 5/00; G10L 3/00; H04R 3/00
[52] U.S. Cl. .................................... 381/43; 381/41; 381/46; 381/92
[58] Field of Search .................... 381/41, 43, 46, 47, 381/71, 91, 92, 94

[56] References Cited

U.S. PATENT DOCUMENTS

| | | | |
|---|---|---|---|
| 4,354,059 | 10/1982 | Ishigaki et al. | 381/92 |
| 4,626,796 | 12/1986 | Elder | 381/97 |
| 4,712,244 | 12/1987 | Zwicker et al. | 381/92 |
| 4,827,520 | 5/1989 | Zeinstra | 381/41 |

FOREIGN PATENT DOCUMENTS 0117497 9/1981 Japan .................................. 381/92

OTHER PUBLICATIONS

IEEE Spectrum Jul. 1988 "Phase Digitizing Sharpens Timing Measurements", David Chu, pp. 28-32.

*Primary Examiner*—Emanuel S. Kemeny
*Assistant Examiner*—Kee M. Tung
*Attorney, Agent, or Firm*—Staas & Halsey

[57] ABSTRACT

This invention relates to a control system for controlling equipment provided inside a vehicle utilizing a speech recognition apparatus inside the vehicle. This control system includes an in-phase component detector (4) for detecting an in-phase component of voice signals from microphones (1), a phase shift and in-phase component detector (5) for shifting a phase of the voice signals to detect an in-phase component, and a command seat discriminator (6) for comparing output levels of the in-phase component detector (4) and the phase shift and in-phase component detector (5). In addition, the control system includes validity/invalidity detector (7) for determining the validity and invalidity of a command content resulting from outputs of a speech recognizer (3) based upon a signal generated from the command seat discriminator (6), and a various controller (8) that controls any one of various pieces of equipment with respect to the valid commands output from the validity/invalidity detector (7) to reliably discriminate commands from the driver's seat and the passenger seats in a noisy vehicle.

4 Claims, 14 Drawing Sheets

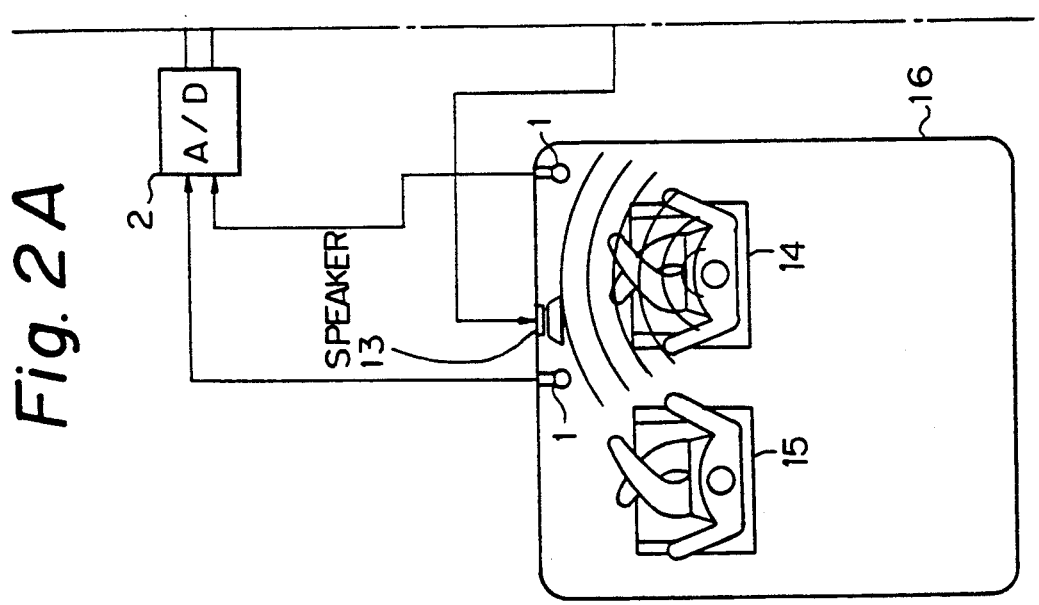

Fig. 7

| COMMAND CONTENT | | DRIVING SEAT | PASSENGER SEAT |
|---|---|---|---|
| AUDIO | ON/OFF | O | O |
| AIR CONDITIONING | ON/OFF | O | O |
| TELEPHONE | ON/OFF | O | O |
| NAVIGATION | ON/OFF | O | O |
| VEHICLE CONTROL | SET | O | X |
| | RESUME | O | X |

O : VALIDITY

X : INVALIDITY

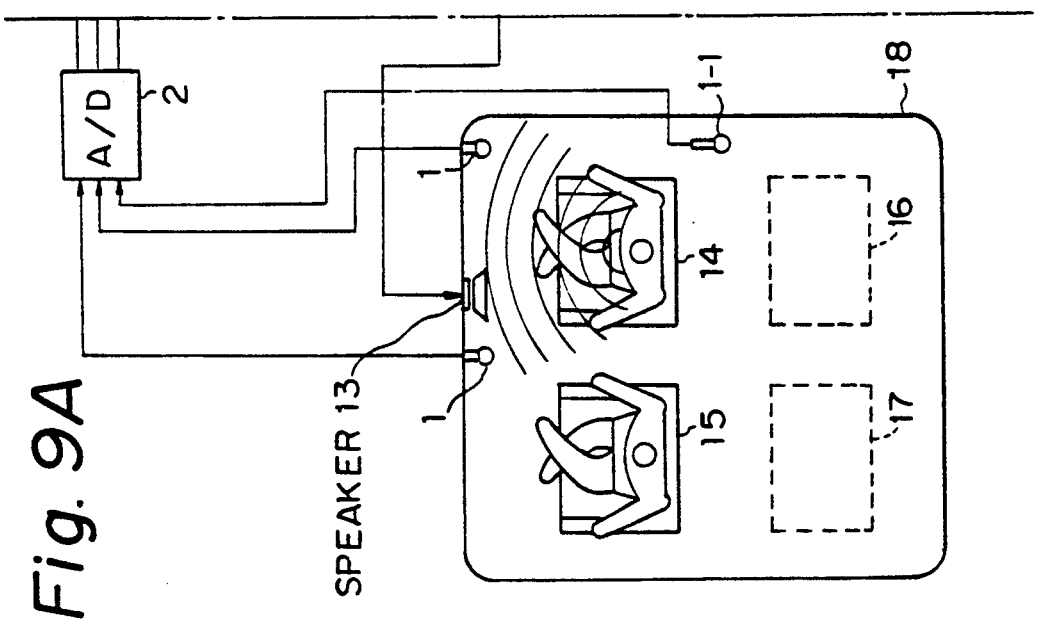

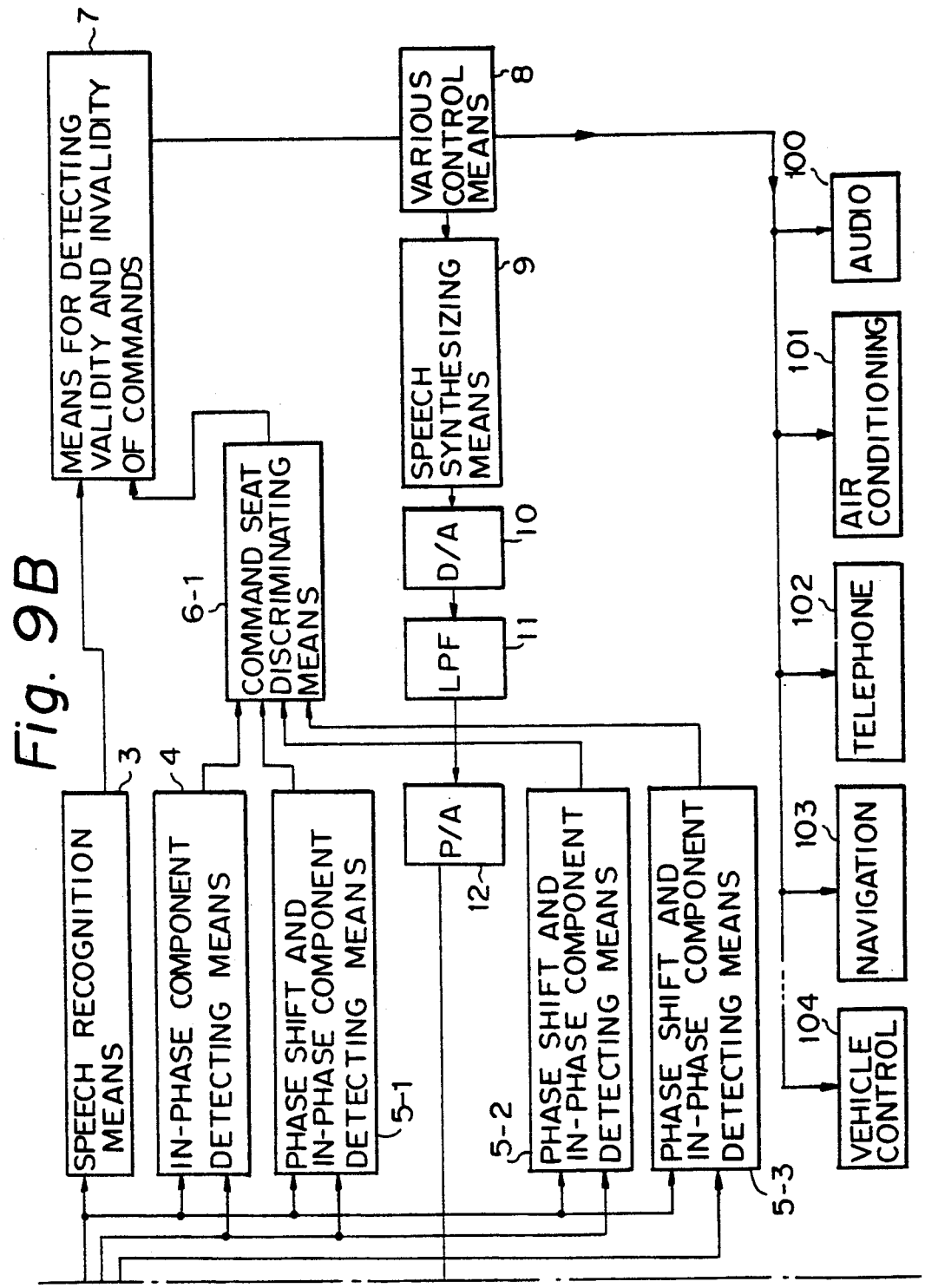

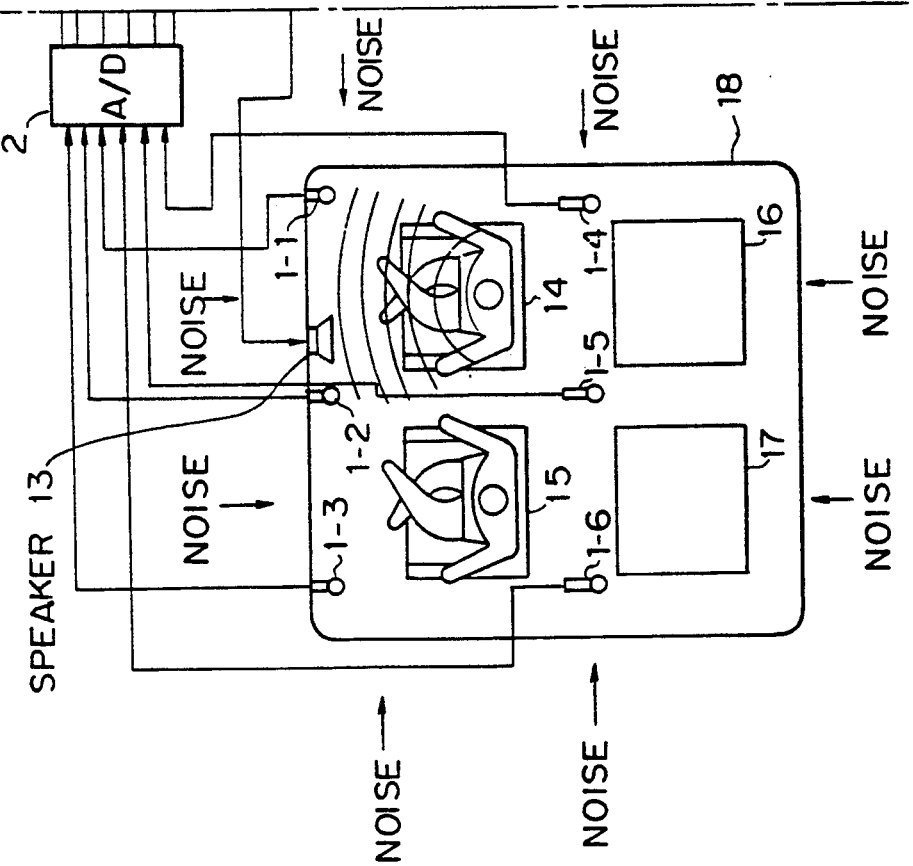

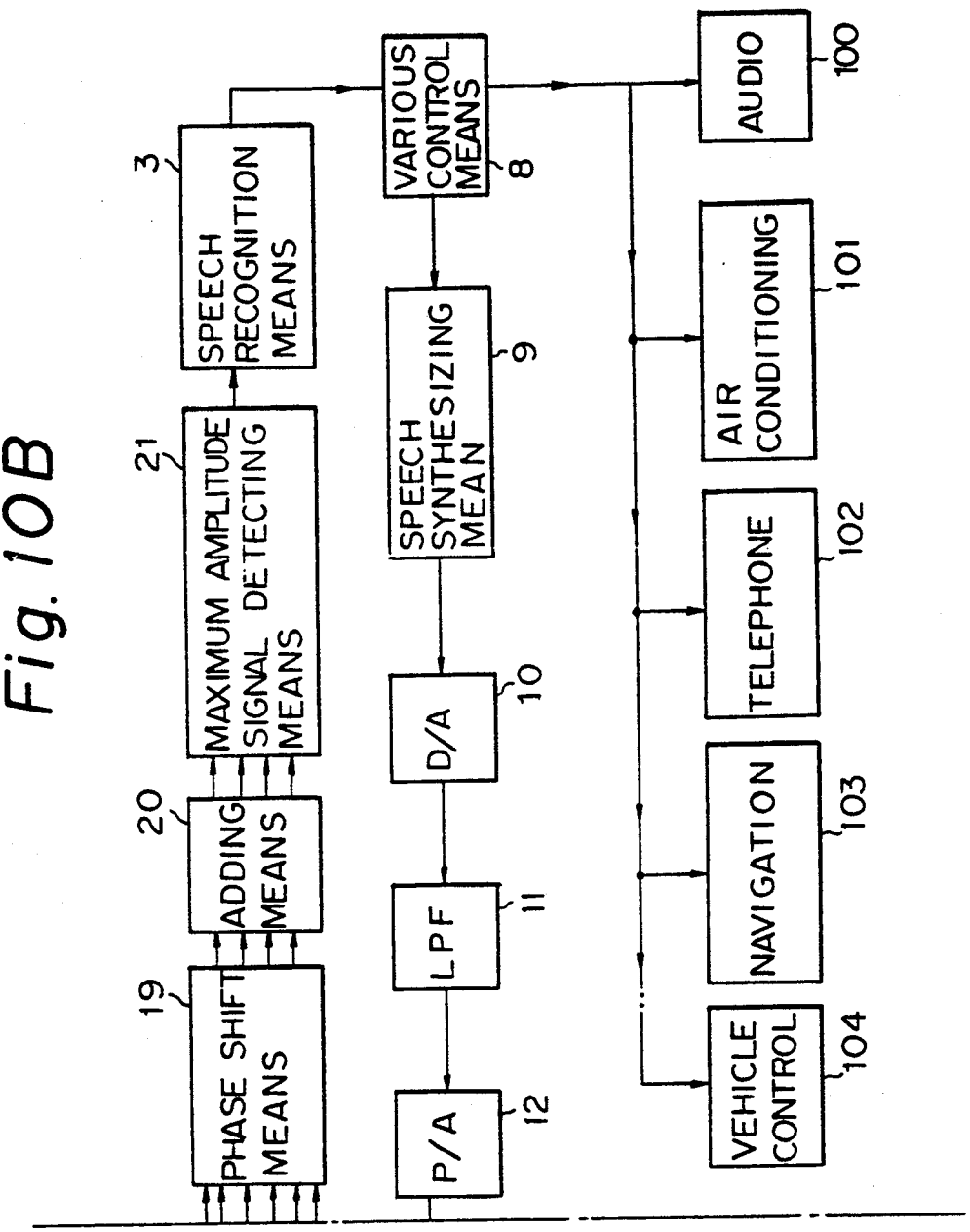

CONTROL SYSTEM FOR CONTROLLING EQUIPMENT PROVIDED INSIDE A VEHICLE UTILIZING A SPEECH RECOGNITION APPARATUS

BACKGROUND OF THE INVENTION

1. Field of the Invention

The present invention relates to a speech recognition apparatus used in a vehicle, which apparatus operates to replace manual operations normally carried out by a driver. More particularly, this invention relates to a speech recognition apparatus which discriminates commands from a driver seat and a passenger seat and enhances the rate of speech recognition in a noisy vehicle room to thereby improve the reliability of the apparatus.

2. Description of the Related Art

A conventional speech recognition apparatus includes a microphone, speech recognition means for comparing an unknown speech pattern, formed by digital electrical signals converted from command voice signals from the microphone, with a registered speech pattern to recognize a speech, and various audio equipment controlled in accordance with the command recognized by the speech recognition means.

In the conventional speech recognition apparatus, when a driver at a driving seat in a vehicle gives the microphone a command of "AUDIO ON" or "AUDIO OFF", the speech recognition means recognizes the command of "AUDIO ON" or "AUDIO OFF" and causes the various equipment to be turned ON or OFF, respectively.

Therefore, the driver does not need to let go of the steering wheel while driving, or to be forced to look away from the road while traveling, to manipulate the various audio equipment.

Also, this speech recognition apparatus also obeys similar commands from a passenger seat, (see, for example, Japanese Unexamined Patent Publication (Kokai) No. 2-77799, No. 2-184898, No. 63-56698). Nevertheless, in the above speech recognition apparatus, since, for example, wipers, and rear view mirrors etc., of the vehicle can be also controlled by commands from the passenger seat, a problem arises in that such important manipulations can be performed by commands from the passenger seat, although not desired by the driver.

Further, although an improvement in the speech recognition rate is desired in the conventional speech recognition apparatus, when used in a vehicle a problem arises in that a wide variety of noise from outside of the vehicle causes a deterioration of the speech recognition rate. To resolve the above problems, if the microphone is given a strong directivity and is thus susceptible only to voice commands from the driving seat, to thereby eliminate outside noise, the desired speech recognition cannot be performed even when there is only a slight difference in the position of the driving seat, and further, the speech recognition from the passenger seat cannot be performed at all, due to the strong directivity of the microphone.

SUMMARY OF THE INVENTION

The object of the present invention is to solve the above problems by providing a speech recognition apparatus which includes an in-phase component detecting means for detecting an in-phase component of voice signals from microphones positioned symmetrically with respect to a driving seat, to thereby obtain a command generated at the driving seat, a phase shift and in-phase component detecting means for detecting an in-phase component after shift by a certain amount of a voice signal phase from the microphones positioned asymmetrically with respect to a passenger seat, to thereby obtain the same phase shift and a command generated at the passenger seat, a command seat discriminating means for comparing outputs levels of said in-phase component detecting means and said phase shift and in-phase component detecting means to discriminate a seat from which a command is generated from among several seats, a determining means for determining a validity and invalidity of commands resulting from a speech obtained from outputs of the said speech recognition means and said command seat discriminating means to thereby control various equipment. Also said plurality of microphones are positioned separately and apart from each other, to enable an input of voice commands generated at each seat in the vehicle, and are provided with a phase shift means for shifting a predetermined amount of phases of electric signals obtained through the microphones with the same phase shift relative to each seat, an adding means for adding output signals of said phase shift means corresponding to each seat, a maximum amplitude signal detecting means for obtaining a maximum amplitude signal among output signals of each adding means as voice commands and outputting said signal to the speech recognition means.

With the above construction, when voice commands are generated at the driving seat, electric signals from the microphones which are in-phase are superimposed and enhanced by the in-phase component detecting means, and electric signals which are not in-phase are shifted in phase by the phase shift and in-phase component detecting means but are not enhanced. Further, when the voice commands are generated at the passenger seat, electric signals from the microphones which are not in-phase are shifted by the in-phase component detecting means but are not enhanced, and when these electric signals are in-phase, they are shifted in phase by the phase shift and in-phase component detecting means and are enhanced. Furthermore, voice commands generated at each seat which are in-phase are shifted in phase and enhanced while noise from various directions which is not in-phase is not enhanced.

Therefore the commands generated at the microphones enable discrimination as to whether they are generated at the driving seat or at the assistant seat and enhancement from the noise with high reliability.

BRIEF DESCRIPTION OF THE DRAWINGS

The invention will be further described with reference to embodiments thereof, and to the accompanying drawings. Note, in the drawings, like parts are designated throughout by the same reference characters.

FIGS. 2A and 2B are views of a speech recognition apparatus in accordance with a first embodiment of the present invention;

FIG. 7 is a view showing a determination of a validity or invalidity of commands obtained from the speech recognition means;

FIGS. 9A and 9B are views of a speech recognition apparatus in accordance with a second embodiment of the present invention;

FIGS. 10A and 10B are views of a speech recognition apparatus in accordance with a third embodiment of the present invention;

DESCRIPTION OF THE PREFERRED EMBODIMENTS

Figure 1:
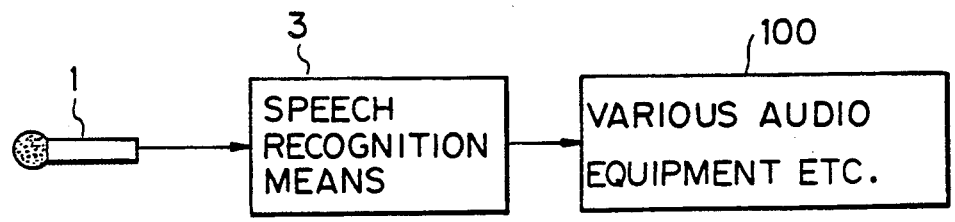
FIG. 1 is a schematic view of a prior art speech recognition apparatus preceding the present invention.

FIG. 1 is a schematic view of a prior art speech recognition apparatus preceding the present invention. Referring to FIG. 1, the speech recognition apparatus comprises a microphone 1, a speech recognition means 3 for comparing an unknown speech pattern formed by digital electrical signals, converted from command voice signals from the microphone 1, with a registered speech pattern to thereby recognize a speech pattern thereof, and various audio equipment 100 controlled in accordance with the command recognized by the speech recognition means 3.

Figure 2B:
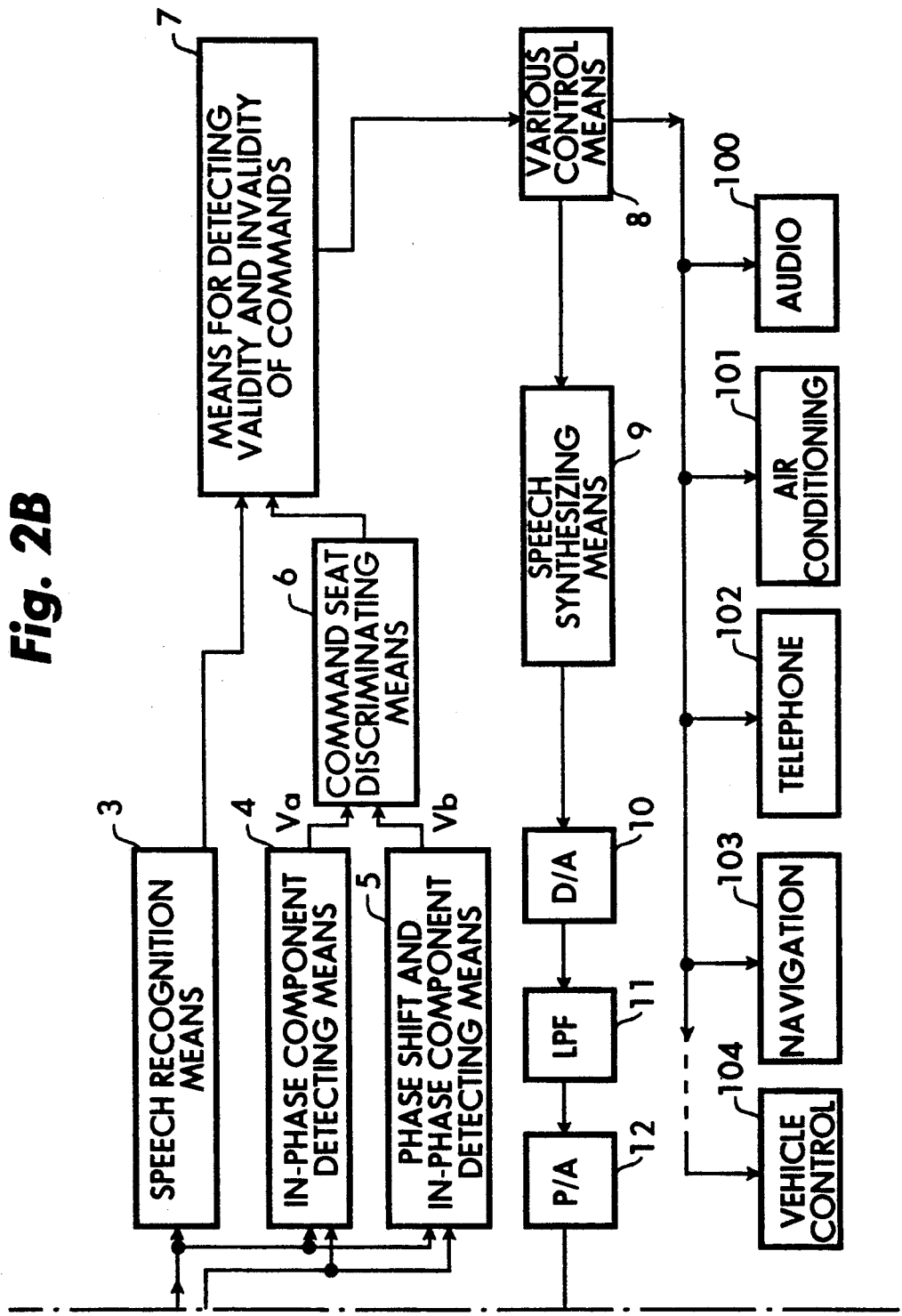

FIGS. 2A and 2B are views of a speech recognition apparatus in accordance with a first embodiment of the present invention. The apparatus shown in these Figures comprise two microphones 1 for converting voice commands to electric signals, an A/D (Analog-to-Digital) converter 2 for converting analog signals from the microphones to digital signals, a speech recognition means 3 for recognizing a voice command from digital signals received from the A/D converter 2, an in-phase component detecting means 4 for detecting an in-phase component of the two microphones 1 through the A/D converter 2 to obtain a command generated at a driving seat, a phase shift and in-phase component detecting means 5 for detecting in-phase components after shifting a certain amount of a voice signal phase from the two microphones 1 through the A/D converter to obtain the same phase shift and a command generated at a passenger seat, a command seat discriminating means 6 for comparing output levels of said in-phase component detecting means 4 and said phase shift and in-phase component detecting means 5, to discriminate a seat at which a command is generated from among several seats, a determining means 7 for determining a validity or invalidity of commands resulting from speech signals obtained from the outputs of said speech recognition means 3 and said command seat discriminating means 6, various control means 8 for controlling, for example, audio equipment 100, air conditioning equipment 101, a telephone 102, navigation equipment 103, and vehicle equipment 104 such as wipers and rear view mirrors, based on the output of the determining means 7, a speech synthesizing means 9 for creating artificial voice signals to thereby output control commands to the various control means 8, a D/A (Digital-to-Analog) converter 10 connected to the output terminal of the speech synthesizing means 9, a low pass filter 11 connected to the output terminal of the D/A converter 10, for removing higher mode noise, a power amplifier 12 for driving a speaker as hereinafter described, a speaker 13 for converting electric signals to artificial voice signals obtained from the speech synthesizing means 9, a driving seat 14 in front of the speaker 13, having two microphones symmetrically positioned with respect thereto, a passenger seat 15 adjacent to the driving seat 14, and a vehicle room containing the two microphones 1, the speaker 13, the driving seat 14, and the passenger seat 15.

Further, the speech recognition means 3, the in-phase component detecting means 4, the phase shift and in-phase component detecting means 5, the command seat discriminating means 6, etc. are all part of a DSP (Digital Signal Processor).

Figure 3:
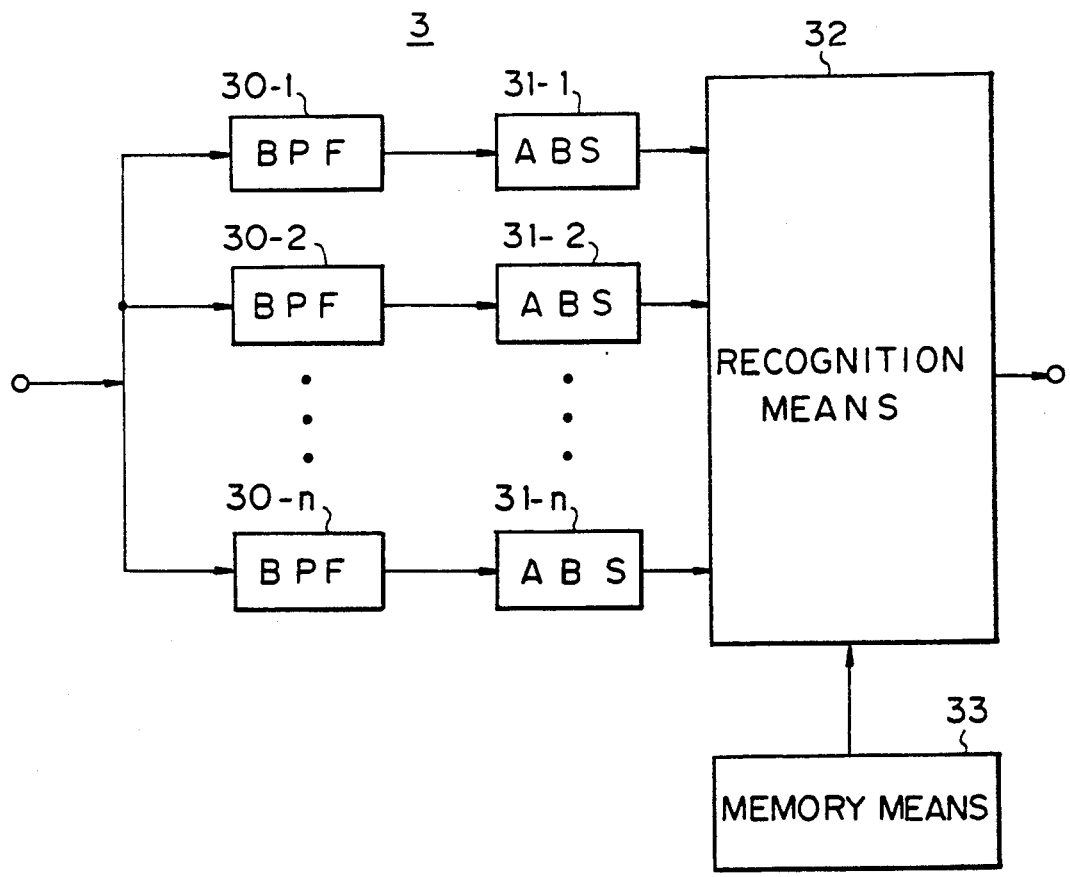
FIG. 3 is a block diagram of a speech recognition means of FIG. 2.

Next, the speech recognition means 3 is described. FIG. 3 is a block diagram of a speech recognition means of FIG. 2. The speech recognition means 3 as shown in this Figure includes a plurality of band pass filters 30-1, 30-2, . . . , 30-n each having a different band, absolute value processing means 31-1, 31-2, . . . , 31-n for forming electric signals from the band pass filters 30-1, 30-2, . . . , 30-n into absolute values, recognition means 32 for comparing an unknown pattern having a frequency distribution obtained from the absolute value processing means 31-1, 31-2, . . . , 31-n with the registered patterns, to thereby recognize a registered pattern which is most similar to the unknown pattern as a command, and memory means 33 for storing the registered patterns required by the recognition means 32. The recognition means 32 carries out the comparison of the unknown pattern and the registered pattern by successively performing a pattern matching such as a linear matching DP (Dynamic Programming). The memory means 33 stores various commands, such as audio ON/OFF, air conditioning ON/OFF, telephone ON/OFF, navigation ON/OFF, and vehicle controls, for example, wipers and rear view mirrors set/resume, as the registered patterns.

Figure 4:
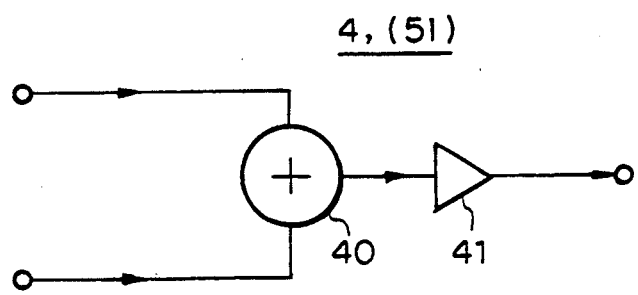
FIG. 4 is a circuit diagram of an in-phase component detecting means of FIG. 2.

Next the in-phase component detecting means 4 is described. FIG. 4 is a circuit diagram of an in-phase component detecting means of FIG. 2. The in-phase component detecting means 4 as shown in the Figure includes an adder 40 for adding electric signals from two microphones positioned symmetrically with respect to the driving seat 14, and a multiplier 41 for adjusting an output level of the adder 40. When the commands generated at the driving seat are received by each microphone 1, electric signals from each microphone 1 are in-phase, due to the positions thereof, and thus are superimposed at the adder 40. Conversely, when commands generated at the passenger seat are received by each microphone 1, electric signals from each microphone 1 are out of phase, due to the positions thereof, but are superimposed at the adder 40.

Figure 5:
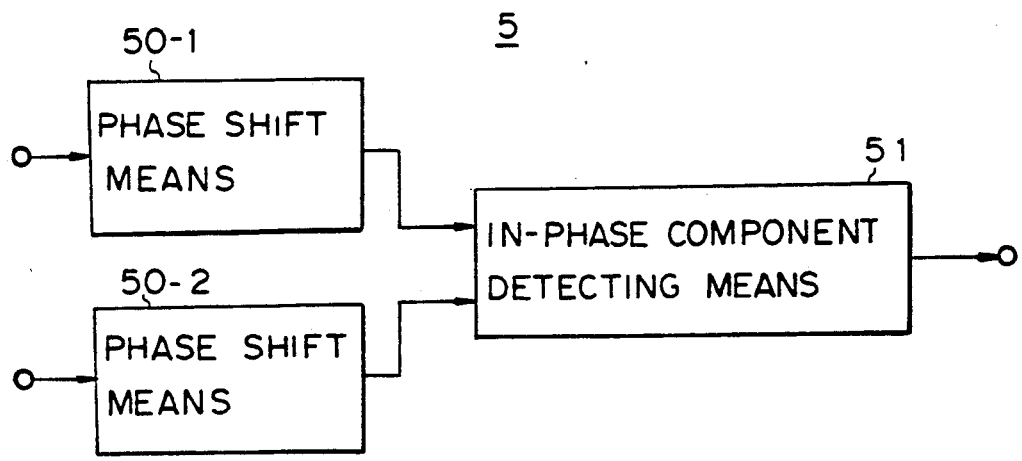
FIG. 5 is a block diagram of a phase shift and in-phase component detecting means of FIG. 2.

Next the phase shift and in-phase component detecting means 5 is described. FIG. 5 is a block diagram of a phase shift and in-phase component detecting means of FIGS. 2A and 2B. As shown in FIG. 5 the phase shift and in-phase component detecting means 5 includes phase shift means 50-1 and 50-2 for shifting the phases in the electric signals from each microphone 1, and an in-phase component detecting means 51 for detecting in-phase components of the phase shift means 50-1 and 50-2.

Figure 6:
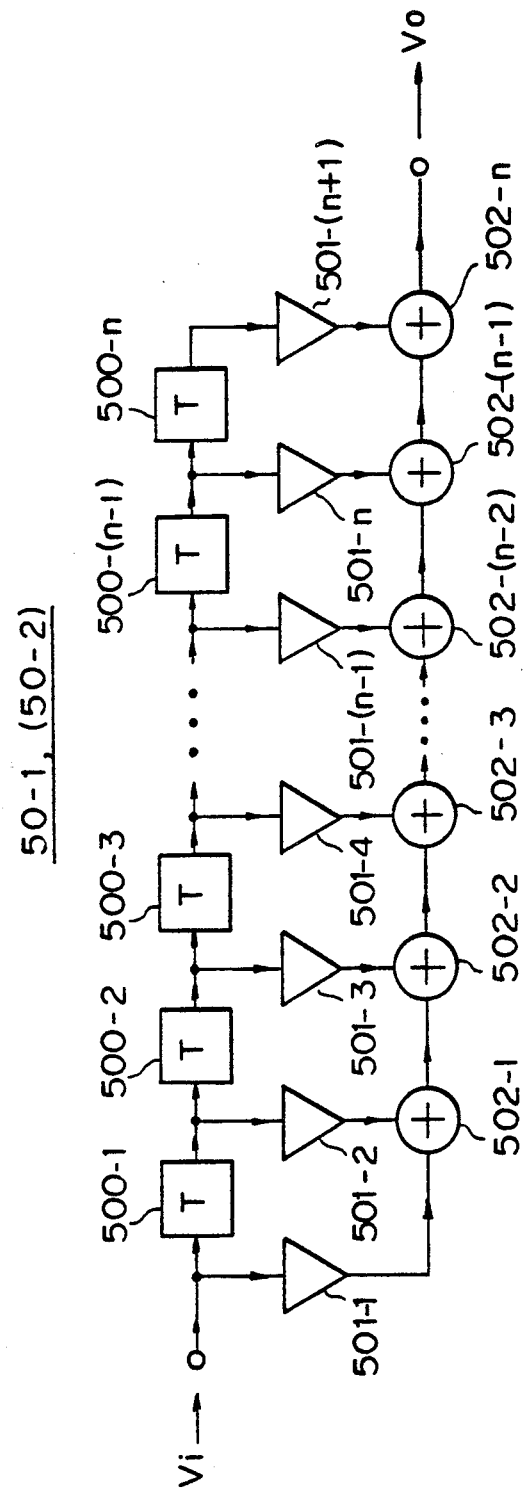
FIG. 6 is a circuit diagram of a phase shift detecting means of FIG. 5.

Next, the phase shift means 50-1 and 50-2 are described FIG. 6 is a circuit diagram of a phase shift detecting means of FIG. 5. As shown in FIG. 6 the phase shift means 50-1 (50-2) includes a plurality of unit delay devices 500-1, 500-2, 500-3, . . . , 500-(n-1), 500-n for respectively delaying one sampling period through a series connection thereof, a plurality of multipliers 501-1, 501-2, 501-3, 501-4, . . . , 501-(n-1), 501-n, 501-(n+1) connected to input terminals or output terminals of each unit delay devices, and a plurality of adders 502-1, 502-2, 502-3, . . . , 50-2(n-2), 502(n-1), 502-n for successively adding the outputs of each of the multipliers. A multiplying coefficient of each multiplier may be adjusted to determine an amount of phase shift. Further, the construction of the in-phase component detecting means 51 is the same as that of the in-phase component detecting means 4, and thus a description thereof is omitted.

At this point, two microphones 1 are positioned symmetrically with respect to the driving seat 14, and asymmetrically with respect to the passenger seat 15. Therefore, as the commands generated at the passenger seat 15 are out of phase in the electric signals from the microphones 1, in the phase shift means 50-1 and 50-2, the multiplying coefficients of the multipliers are adjusted to be in-phase with respect to the input signals. Accordingly, a certain amount of phase from the microphones 1 is shifted and adjusted so that the in-phase component detecting means 51 of the phase shift and in-phase component detecting means can superimpose voice signals from the two microphones 1 with respect to the commands from the passenger seat 5, at the output level thereof.

Further, with respect to the commands generated at the passenger seat 15, the in-phase component detecting means 4 cannot cause a superimposing of the voice signals from the two microphones 1 at the output level, since each electric signal has a phase shift.

Next, the command seat discriminating means 6 is described. The command seat discriminating means 6 consists of a comparator which outputs an "H (High)" signal when Va≧Vb, or an "L (Low)" signal when Va<Vb; where the output signals of the in-phase component detecting means 4, and the phase shift and in-phase component detecting means 5 are represented by Va and Vb respectively. When the command seat discriminating means 6 outputs an "H" signal, the command is discriminated as generated at the driving seat 14, since Va≧Vb, i.e., the output level of the electric signals passing through the in-phase component detecting means 4 is higher than that of electric signals passing through the phase shift and in-phase component detecting means. In the reverse case, the command is discriminated as generated at the passenger seat 15.

Next, the means 7 for determining the validity and invalidity of commands is described. FIG. 7 is a view showing a determination of the validity and invalidity of commands resulting from a speech recognition thereof. As shown in this Figure, the means 7 for determining the validity and invalidity of command determines the command to be valid if the command is, for example, AUDIO ON/OFF, AIR CONDITIONING ON/OFF, NAVIGATION ON/OFF VEHICLE CONTROL SET/RESUME, which can be recognized by the speech recognition means 3, and is discriminated as generated at the driving seat 14 by the command seat discriminating means 6. Also, the means 7 determines the command to be valid if the command is, for example, AUDIO ON/OFF, AIR CONDITIONING ON/OFF, NAVIGATION ON/OFF, which can be recognized by the speech recognition means 3 and is discriminated as generated at the passenger seat 15 by the command seat discriminating means 6. The means 7 determines the command to be invalid if the command is, for example, VEHICLE CONTROL SET/RESUME, which is recognized by the speech recognition means 3 and is discriminated as generated at the passenger seat by the command seat discriminating means 6. Accordingly, a voice command from the passenger seat cannot interfere with matters which the driver should determine from a vehicle control point of view, but can be used as a command for providing various services other than the above-mentioned matters.

Figure 8:
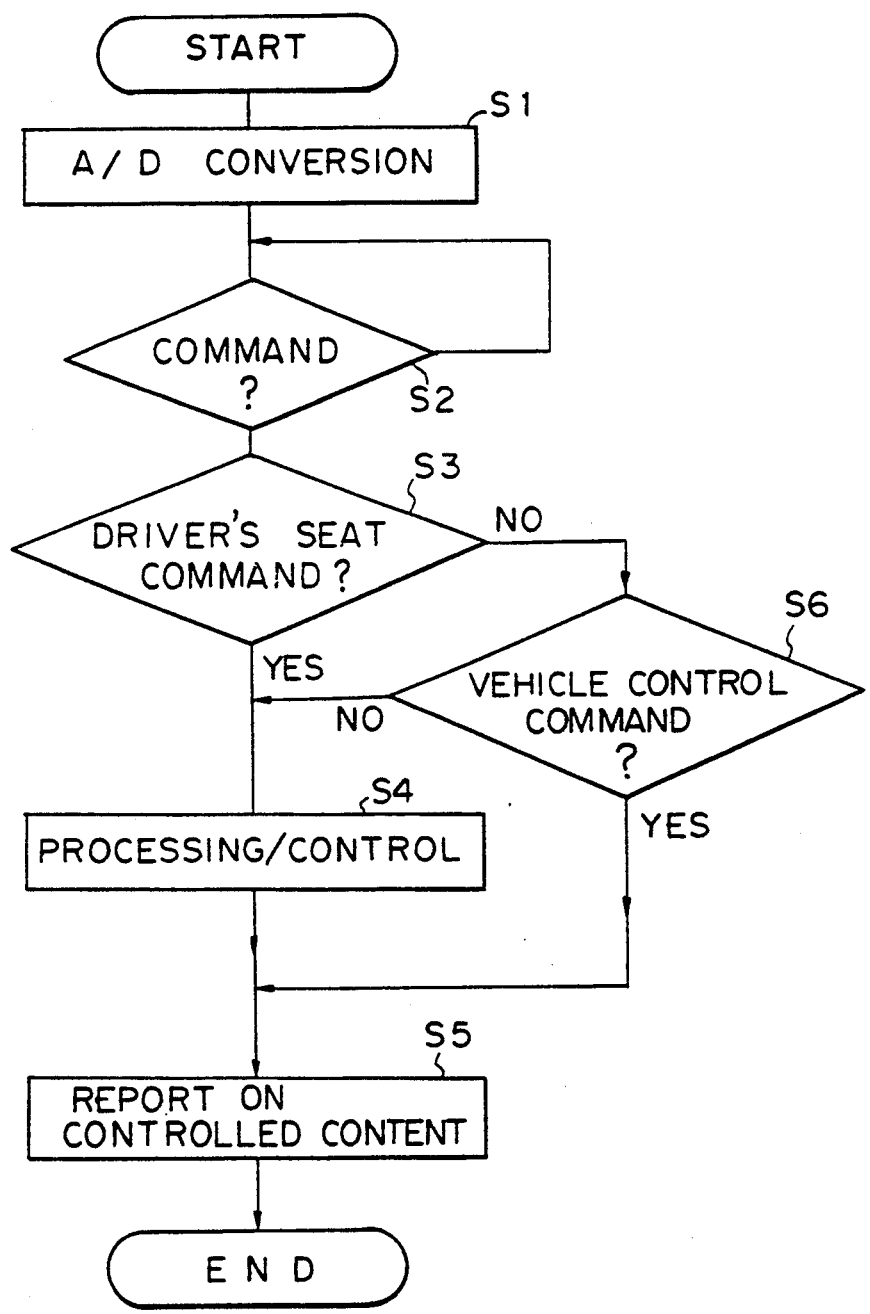
FIG. 8 is a flowchart illustrating a consecutive operation in accordance with the first embodiment of the present invention.

Next, a series of operations in accordance with the embodiment is described. FIG. 8 is a flowchart illustrating a consecutive operation in accordance with the first embodiment of the present invention. As shown in this Figure, analogue electric signals of the command received through the microphones 1 are converted into digital signals (step 1). The unknown pattern formed in the digital signals of the command is then processed by the speech recognition means 3 to determine whether or not it is a registered pattern (step 2). If the unknown pattern of the commands is the same as a registered pattern, the commands are processed by the in-phase component detecting means 4 to determine whether or not they are generated at the driving seat (step 3). If the commands are generated at the driving seat, the ON/OFF control of the corresponding audio equipment 100, air conditioning equipment 101, telephone equipment 102, and navigation equipment 103, and the vehicle set/resume control 104 is performed, through the various controlling means 8 (step 4). Further, the control content passed through the various controlling means 8 is processed to be converted to voice signals by the speech synthesizing means 9, is reproduced as speech through the D/A converter 10, the low pass filter 11 and the power amplifier 12, and is broadcast at the driving seat 14 (step 5). At step 3, if the commands are determined to be from the passenger seat 15, it is determined whether the commands are vehicle control commands (step 6). If these commands are not vehicle control commands but are, for example, audio equipment ON/OFF commands, the processing and control thereof are performed at step 4. If the commands are vehicle control commands, they are not processed and controlled but are broadcast at the driving seat 14 (step 5).

FIGS. 9A and 9B are views of a speech recognition apparatus in accordance with a second embodiment of the present invention. The speech recognition apparatus shown in this Figure is the same as that of the first embodiment of FIGS. 2A and 2B, except that rear seats 16 and 17 are included in the vehicle room 18, a microphone 1-1 is provided at the rear seat 16 near to the driving seat 14, a phase shift and in-phase component detecting means 5-1, 5-2 and 5-3 is provided for the passenger seat 15 and the rear seats 17 and 16, respectively, and a command seat discriminating means 6-1 is provided for comparing the output level of the in-phase component detecting means 4 and the maximum output level of the phase shift and in-phase component detecting means 5-1, 5-2 and 5-3. The phase shift and in-phase component detecting means 5-2 adjusted to detect the same in-phase signals from the two microphones 1, taking into consideration the asymmetrical positions thereof with respect to the rear seat 17, which is different from that of the passenger seat 15. Since the microphones 1 are symmetrical with respect to the rear seat 16, to prevent the danger of an error in a command at the driving seat 14, or conversely, in a command at the rear seat 16, the phase shift and in-phase component detecting means 5-3 is adjusted to detect the same in-phase signals at each of the microphones 1 and the microphone 1-1, taking into consideration the asymmetrical position thereof with respect to the rear seat 16. Therefore, when command is given from the rear seat 16, in the in-phase component detecting means 4 and the phase shift and in-phase component detecting means 5-3, the output level of the latter becomes too great to be discriminated from a command from the driving seat 14. In the seat discriminating means 6-1, if the output level of the in-phase component detecting means 4 is greater than that of any phase shift and in-phase component detecting means 5-1, 5-2 and 5-3, the command is discriminated as being from the driving seat 14. Conversely, if it is smaller than that of any means 5-1, 5-2 and 5-3, the command is discriminated as being from a seat other than the driving seat 14.

FIGS. 10A and 10B are views of a speech recognition apparatus in accordance with a third embodiment of the present invention. The speech recognition apparatus shown in this Figure is the same as that of the second embodiment of FIGS. 9A and 9B, except that microphones 1-1, 1-2, 1-3, 1-4, 1-5 and 1-6 are positioned separate from each other, and input voice commands from each seat in the vehicle room, a phase shift means 19 for shifting phases of electric signals through the microphones and A/D converter with the same phase shift relative to each seat, an adding means 20 for adding output signals of the phase shift means 19 corresponding to said each seat, and a maximum amplitude signal detecting means 21 for detecting the maximum amplitude signal of output signals of each adding means 20 as the voice commands to be output to the speech recognition means 3, are provided.

Figure 11:
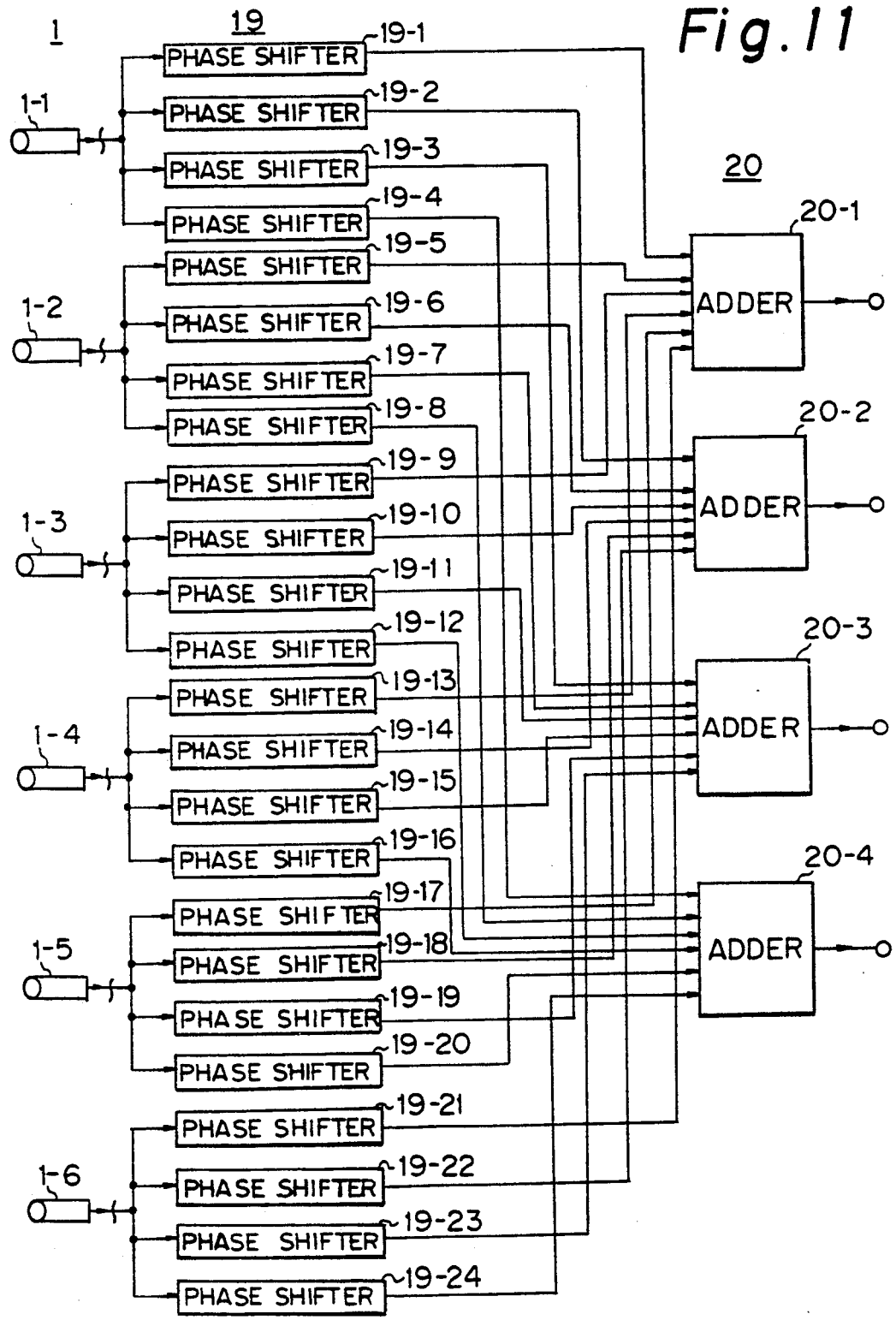
FIG. 11 is a view of a processing circuit of the phase shifting means and adding means, for processing signals from microphones provided at each seat of FIG. 10.

Next, the phase shift means 19 and the adding means 20 are described in detail. FIG. 11 shows a processing circuit of phase shifting means and adding means for processing signals from each microphone provided at each seat of FIGS. 10A and 10B. The phase shift means 19 shown in this Figure includes phase shifters 19-1, 19-2, 19-3 and 19-4 connected to the microphone 1-1 at the corresponding above four seats through an A/D converter 2, not shown in the Figure, and phase shifters 19-5, 19-6, 19-7 and 19-8 connected to the microphone 1-2, . . . , and phase shifters 19-21, 19-22, 19-23 and 19-24 connected to the microphone 1-6. The adding means 20 includes an adder 20-1 for adding outputs of the phase shifters 19-1, 19-5, 19-9, 19-13, 19-17 and 19-21, an adder 20-2 for adding outputs of the phase shifters 19-2, 19-6, 19-10, 19-14, 19-18 and 19-22, . . . , and an adder 20-4 for adding outputs of the phase shifters 19-4, 19-8, 19-12, 19-16, 19-20 and 19-24.

Figure 12:
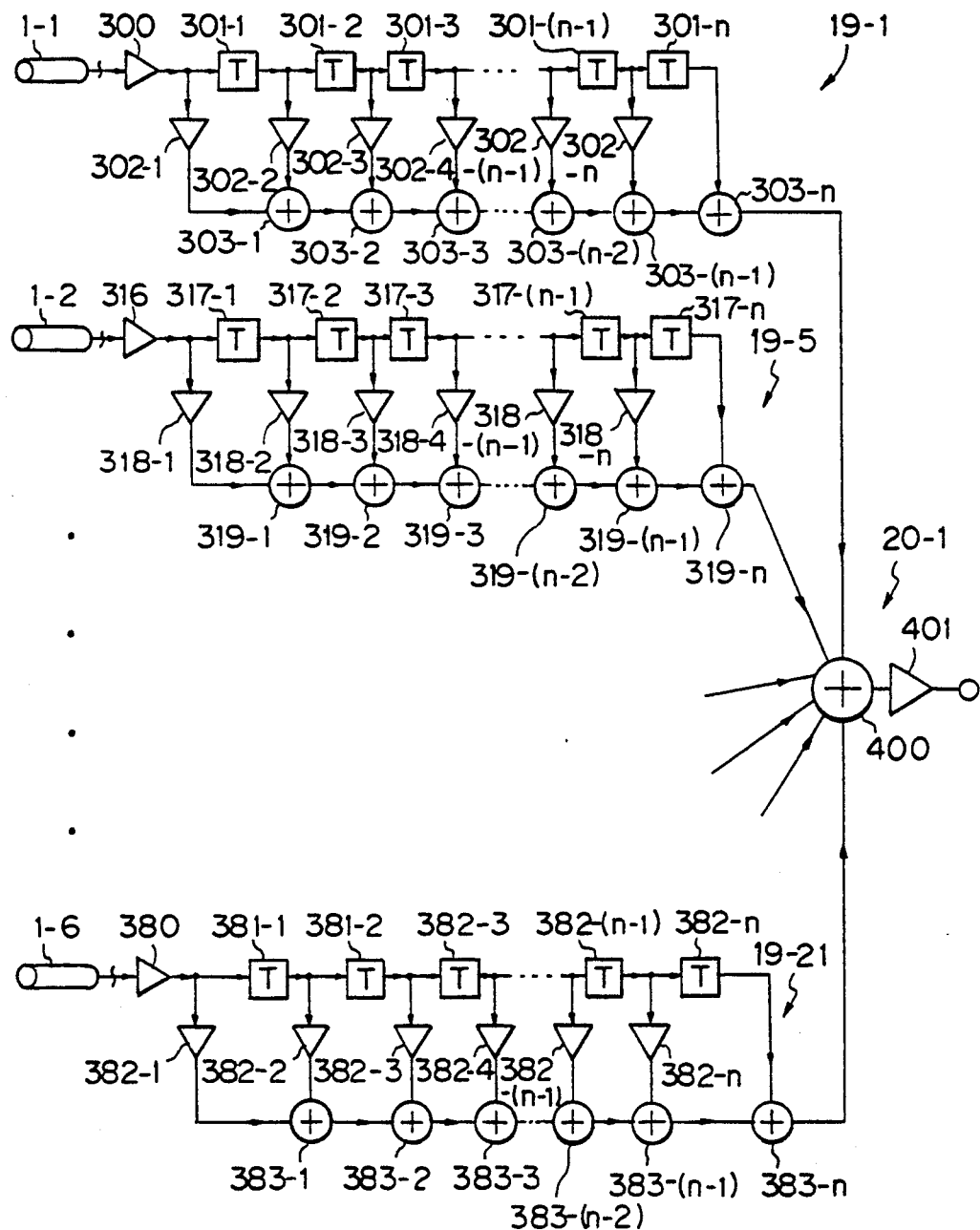
FIG. 12 is a view of the phase shifting means connected to the adding means 4-1 of FIG. 11.

FIG. 12 shows the phase shifting means connected to the adding means 20-1 of FIG. 11. The phase shifter 19-1 in the phase shifting means 19 shown in this Figure includes an amplifier 300 connected to the microphone 1-1, a plurality of unit delay devices 301-1, 301-2, 301-3, . . . , 301-(n-1) and 301-n connected in series, for delaying one sampling period of input signal from the amplifier 300, respectively, a plurality of multipliers 302-1, 302-2, 302-3, 302-4, . . . , 302-(n-1) and 302-n connected to input terminals of each of the unit delay devices, and a plurality of adders 303-1, 303-2, 303-3, . . . , 303-(n-2), 303-(n-1), 303-n for successively adding outputs of each of the multipliers. Further, the phase shifter 19-5 includes an amplifier 316 connected to the microphone 1-2, a plurality of unit delay devices 317-1, 317-2, 317-3, . . . , 317-(n-1) and 317-n connected in series, for delaying one sampling period of input signal from the amplifier 316, respectively, a plurality of multipliers 318-1, 318-2, 318-3, 318-4, . . . , 318-(n-1) and 318-n connected to input terminals of each of the unit delay devices, and a plurality of adders 319-1, 319-2, 319-3, . . . , 319-(n-2), 319-(n-1), 319-n for successively adding outputs of each of the multipliers . . . The phase shifter 19-21 includes an amplifier 380 connected to the microphone 1-6, a plurality of unit delay devices 381-1, 381-2, 381-3, . . . , 381-(n-1) 381-n connected in series, for delaying one sampling period of input signal from the amplifier 380, respectively, a plurality of multipliers 382-1, 382-2, 382-3, 382-4, . . . , 382-(n-1) and 382-n connected to input terminals of each of the unit delay devices, and adders 383-1, 383-2, 383-3, . . . , 383-(n-2), 383-(n-1), 383-n for successively adding outputs of each of the multipliers. Also, the adding means 20-1 is provided with an adder 400 for adding outputs of the adders 303-n, 319-n, . . . , and 383-n and an amplifier 401 for amplifying the output of the adder 400. For example, when the voice command is generated at the driving seat 14 as shown in FIG. 10A, the phases of the voice command received by the microphones 1-1, 1-2, . . . , 1-6 are different, and thus an adjustment of the multiplying coefficients relative to each of the multipliers corresponding to each of the phase shifters 19-1, 19-5, . . . , 19-21 causes the phase shifts due to differences in the positions of the microphones to be the same as each other. Accordingly, each signal from each of the microphones in the vehicle room 18 is shifted in phase so as to be the same as each other, and is added by the adding means 20-1 and is superimposed.

On the other hand, where the noise as shown in FIG. 10A comes from the left and right directions at a right angle to the vehicle running direction, or from the front and rear relative to the vehicle running direction, each microphone is positioned so as to produce a phase shift among the microphones 1-1, 1-2 and 1-3, among the microphones 1-4, 1-5 and 1-6, between the microphones 1-1 and 1-4, between the microphones 1-2 and 1-5, and between the microphones 1-3 and 1-6, with respect to the above-mentioned noise. Conversely, the microphones 1-1 and 1-2 or 1-4 and 1-5 are positioned relative to each other roughly symmetrically to the left and right with respect to the voice command from the driving seat 14, and further, the microphones 1-1 and 1-4 or 1-2 and 1-5 are positioned relative to each other roughly symmetrically to the front and rear thereof, whereby the phase shift means 19 adjusts the outputs of each microphone so that they are in the same phase as each other, whereby the level of the voice command received by each of the microphones is enhanced to thus improve the S/N relative to the noise. Note, with regard to the microphones 1-3 and 1-6 positioned asymmetrically at the left and right, and which make no contribution to a reduction of the noise level, the gain of the amplifier of the phase shifter 19-9 and the amplifier 380 of the phase shifter 19-21 may be made zero. Although the above explanation has been made with regard to the driving seat 14, the explanation relative to the passenger seat 15, and the rear seats 16 and 17 is the same.

Figure 13:
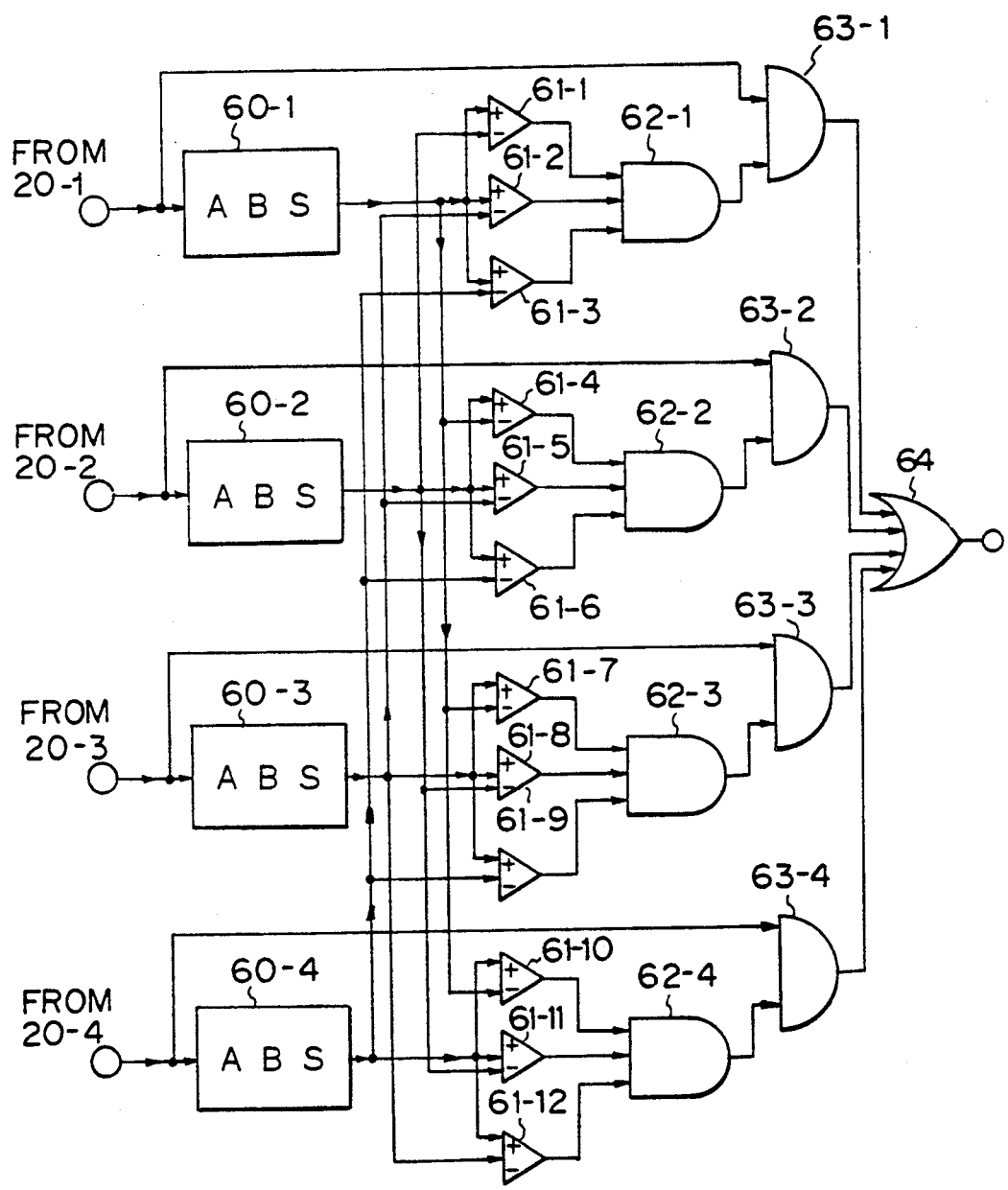
FIG. 13 is a view of a maximum amplitude signal detecting means of FIG. 10.

Next, the maximum amplitude signal detecting means 21 is described. FIG. 13 shows a maximum amplitude signal detecting means of FIGS. 10A and 10B for a speech recognition. The maximum amplitude signal detecting means as shown in this Figure includes absolute value processed means 60-1, 60-2, 60-3 and 60-4 connected to the adding means 20-1, 20-2, 20-3 and 20-4 as shown in FIG. 13, comparators 61-1, 61-2 and 61-3 each having a noninversion terminal thereof connected to the absolute value processed means 60-1 respectively, and an inversion terminal thereof connected to each of the absolute value processed means 60-2, 60-3 and 60-4 respectively, comparators 61-4, 61-5 and 61-6 each having a non inversion terminal connected to the absolute value processed means 60-2 respectively, and an inversion terminal thereof connected to each of the absolute value processed means 60-1, 60-3 and 60-4 respectively, . . . , comparators 61-10, 61-11 and 61-12 each having a non inversion terminal thereof connected to the absolute value processed means 60-4 respectively, and an inversion terminal thereof connected to each of the absolute value processed means 60-1, 60-2 and 60-3, AND circuits 62-1, 62-2, 62-3 and 62-4 each having an input terminal connected to the output terminals of the comparators 61-1, 61-2 and 61-3, 61-4, 61-5 and 61-6, 61-7, 61-8 and 61-9, and 61-10, 61-11 and 61-12 respectively, gate circuits 63-1, 63-2, 63-3 and 63-4 for controlling each of the output signals of the adding means 20-1, 20-2, 20-3 and 20-4 by each of outputs of the AND circuits 62-1, 62-2, 62-3 and 62-4 respectively, and an OR circuit having input terminals connected to each of the output terminals of the gate circuits 63-1, 63-2, 63-3 and 63-4. With respect to the driving seat 14, the passenger seat 15, and the rear seats 16, and 17, the signals from the adding means 20-1, 20-2, 20-3 and 20-4, which are processed to be shifted in phase and added, are compared by the comparators 61-1, 61-2, . . . , 61-12 through the absolute value processing means 60-1, 60-2, 60-3 and 60-4, whereby for example, when the voice commands are generated at the driving seat 14, the maximum amplitude signals relative to the driving seat 14 are selected by the AND circuit 62-1 to thereby control the gate circuit 63-1 corresponding to the AND circuit 62-1 and detected through the OR circuit 64 In this case, with respect to the passenger seat 15 and the rear seats 16 and 17, but not to the driving seat 14, signals which are shifted in phase and added do not include superimposed components and thus do not have a maximum amplitude. Accordingly, the microphones 1-1, 1-2, . . . , 1-6 have a directivity relative to the driving seat 14, the passenger seat 15, and the rear seats 16 and 17 according to the positions of the microphones, the phase shift means 19, the adding means 20 and the maximum amplitude signal detecting means 21.

Further, in the speech recognition apparatus in accordance with a fourth embodiment of the present invention signals can be input to the speech recognition means 3 not only from the A/D converter 2 through the center microphone 1 as in the first and the second embodiments respectively shown in the FIGS. 2A and 2B, and 9A and 9B, but also from the command seat discriminating means 6, to thereby obtain a signal which is detected as a maximum amplitude signal as it is, in the same way as in the third embodiment, to obtain a highly accurate speech recognition.

The present invention provides a speech recognition apparatus having a high discriminative reliability and a high recognition enhancement, due to the use of different phase shifts of signals obtained by a plurality of microphones positioned at a driving seat, a passenger seat and rear seats of the vehicle.

I claim:

1. A control system controlling vehicle equipment provided inside a vehicle utilizing a speech recognition apparatus having microphones installed inside the vehicle and speech recognition means for recognizing a voice command having a command content transmitted from the microphones controlling the vehicle equipment including one of audio, air conditioning, telecommunication, navigation and vehicle control equipment installed inside the vehicle and outputting a speech signal responsive to the voice command, said control system comprising:

first means including in-phase component detecting means for detecting a first in-phase component having a first output level of voice signals including the voice command for operating the vehicle equipment and transmitted by the microphone positioned symmetrically with respect to a driver seat, and said first means for determining that the voice command is generated at said driver seat;

second means including phase shift and in-phase component detecting means for shifting a first phase transmitted by one of the microphones generating a first shifted signal, and a second phase transmitted by another of the microphones generating a second shifted signal, and for generating a second in-phase component having a second output level using said first and second shifted signals for operating said vehicle equipment, said microphones being positioned asymmetrically with respect to passenger seats, and said second means for determining that the voice command is generated at said passenger seats;

command seat discriminating means for comparing the first and second output levels to determine from which seat the voice command was generated among several seats, and for generating a command seat signal identifying the seat; and determining means for determining validity or invalidity of the command content using the speech signal output from the speech recognition means, the command seat signal output from said command seat discriminating means and predetermined criteria, and when the voice command is issued from said driver seat the voice command is valid, and when the voice command is issued from one of said passenger seats the voice command is valid or invalid based upon the predetermined criteria, and said control system controls the vehicle equipment when the voice command is valid.

2. A control system according to claim 1, wherein:
said vehicle includes front and rear passenger seats,
said microphones are arranged asymmetrically with respect to the front and the rear passenger seats of the vehicle, and
said phase shift and in-phase component detecting means receive front and rear voice signals having front and rear voice commands from the front and the rear passenger seats, respectively, transmitted by said microphones.

3. A control system for controlling vehicle equipment including first and second vehicle equipment provided inside a vehicle utilizing a speech recognition apparatus having microphones installed inside the vehicle, and speech recognition means for recognizing voice commands transmitted from the microphones for controlling vehicle equipment including one of audio, air conditioning, telecommunication, navigation, and vehicle control equipment installed inside the vehicle, said control system comprising:

the microphones, separated from each other for receiving the voice commands generated at each seat in the vehicle including a command for controlling said vehicle equipment;

phase shift means for shifting phases of a predetermined amount of electric signals transmitted by the microphones with an in-phase shift relative to each seat and outputting shifted signals;

adding means for adding the shifted signals output from said phase shift means corresponding to each seat and outputting an added signal; and maximum amplitude signal detecting means for detecting a maximum amplitude signal using the added signal output from said adding means as the voice commands and outputting the maximum amplitude signal to the speech recognition means, and said control system controls the first vehicle equipment when the voice commands are issued from a predetermined seat position and controls the second vehicle equipment independent of the seat where the voice commands are issued.

4. A control system controlling vehicle equipment provided inside a vehicle having a driver seat and passenger seats, comprising:

microphones, installed in the vehicle symmetrically with respect to the driver seat and asymmetrically with respect to the passenger seats;

voice location determining means for determining a location in the vehicle where a voice command received from said microphones is generated, said location being the driver seat or one of the passenger seats; and voice validity determining means for determining whether the voice command received from said voice location determining means is valid based on the location where the voice command was generated and based on predetermined validity criterion.

* * * * *